United States Patent
Skoyles et al.

(10) Patent No.: US 10,436,640 B2
(45) Date of Patent: Oct. 8, 2019

(54) ALIGNMENT ASSEMBLY AND METHOD FOR MULTI-SPECTRAL OPTICAL SYSTEMS

(71) Applicant: RAYTHEON COMPANY, Waltham, MA (US)

(72) Inventors: Liam Skoyles, Allen, TX (US); Patrick W. Clark, Melissa, TX (US)

(73) Assignee: RAYTHEON COMPANY, Waltham, MA (US)

( * ) Notice: Subject to any disclaimer, the term of this patent is extended or adjusted under 35 U.S.C. 154(b) by 24 days.

(21) Appl. No.: 15/785,841

(22) Filed: Oct. 17, 2017

(65) Prior Publication Data

US 2019/0113386 A1   Apr. 18, 2019

(51) Int. Cl.

| | |
|---|---|
| *G01J 3/02* | (2006.01) |
| *G01J 3/28* | (2006.01) |
| *G01J 3/10* | (2006.01) |
| *G02B 7/00* | (2006.01) |
| *G01B 11/27* | (2006.01) |

(Continued)

(52) U.S. Cl.
CPC .......... *G01J 3/0289* (2013.01); *G01B 11/272* (2013.01); *G01J 3/021* (2013.01); *G01J 3/0229* (2013.01); *G01J 3/0297* (2013.01); *G01J 3/108* (2013.01); *G01J 3/2823* (2013.01); *G01J 5/522* (2013.01); *G02B 7/003* (2013.01); *G01J 3/36* (2013.01); *G02B 27/1013* (2013.01)

(58) Field of Classification Search
CPC ....................................................... G01J 3/108
See application file for complete search history.

(56) References Cited

U.S. PATENT DOCUMENTS

| | | |
|---|---|---|
| 2,171,571 A | 9/1939 | Karnes |
| 2,800,718 A | 7/1957 | Benford |
| | (Continued) | |

FOREIGN PATENT DOCUMENTS

| | | |
|---|---|---|
| DE | 3445672 A1 | 6/1986 |
| WO | 9741460 A2 | 11/1997 |

OTHER PUBLICATIONS

Invitation to Pay Additional Fees in application No. PCT/US2018/042834 dated Oct. 29, 2018.

(Continued)

*Primary Examiner* — David P Porta
*Assistant Examiner* — Djura Malevic
(74) *Attorney, Agent, or Firm* — Lando & Anastasi, LLP

(57) ABSTRACT

Aspects are generally directed to an alignment assembly and method for aligning a multi-spectral optical system. In one example, an alignment assembly includes an illumination source configured to emit illumination in a first spectral band, and a first plate having a plurality of apertures formed in a reflective surface thereof. The reflective surface of the first plate is disposed to reflect the illumination emitted by the illumination source. The alignment assembly may also include a second plate positioned proximate to the first plate and spaced apart from the first plate to define a gap between the first plate and the second plate, the first plate being interposed between the second plate and the illumination source, and a heating element coupled to the second plate and configured to heat the second plate to emit thermal infrared radiation, from the second plate, in a second spectral band.

20 Claims, 6 Drawing Sheets

(51) Int. Cl.
   *G01J 5/52*     (2006.01)
   *G02B 27/10*    (2006.01)
   *G01J 3/36*     (2006.01)

(56) References Cited

U.S. PATENT DOCUMENTS

| | | | |
|---|---|---|---|
| 3,371,212 A | 2/1968 | Weiss | |
| 3,614,238 A | 10/1971 | Stites | |
| 4,080,623 A | 3/1978 | Needs | |
| 4,238,157 A | 12/1980 | Strauch et al. | |
| 4,308,551 A | 12/1981 | Ohnuma et al. | |
| 4,422,758 A | 12/1983 | Godfrey et al. | |
| 4,561,775 A * | 12/1985 | Patrick | G01S 7/4811 250/332 |
| 4,811,061 A | 3/1989 | Sud et al. | |
| 4,855,777 A | 8/1989 | Suda et al. | |
| 4,902,128 A | 2/1990 | Siebecker et al. | |
| 5,247,173 A * | 9/1993 | Benchetrit | G01S 17/48 250/230 |
| 5,266,790 A * | 11/1993 | Markle | G02B 7/28 250/201.2 |
| 5,311,004 A * | 5/1994 | Kusaka | G02B 7/36 250/201.8 |
| 5,315,341 A | 5/1994 | Hibbard | |
| 5,491,343 A | 2/1996 | Brooker | |
| 5,774,219 A * | 6/1998 | Matsuura | G01D 5/38 250/237 G |
| 5,789,735 A * | 8/1998 | Gigioli, Jr. | G02B 27/4294 250/208.1 |
| 5,805,941 A * | 9/1998 | Iyama | G02B 7/34 396/268 |
| 5,900,942 A | 5/1999 | Spiering | |
| 6,211,951 B1 | 4/2001 | Guch, Jr. | |
| 6,239,912 B1 * | 5/2001 | Ozawa | G02B 7/346 359/618 |
| 6,359,681 B1 * | 3/2002 | Housand | G01S 7/481 356/4.01 |
| 6,765,663 B2 | 7/2004 | Byren et al. | |
| 6,949,772 B2 | 9/2005 | Shimizu et al. | |
| 8,934,097 B2 | 1/2015 | Rushford | |
| 9,372,340 B2 * | 6/2016 | Williams | G02B 26/08 |
| 9,726,524 B2 * | 8/2017 | Fest | G01D 5/30 |
| 2002/0075990 A1 * | 6/2002 | Lanza | G01T 1/295 378/2 |
| 2003/0174315 A1 | 9/2003 | Byren et al. | |
| 2004/0264626 A1 | 12/2004 | Besson | |
| 2006/0261278 A1 * | 11/2006 | Accorsi | G01T 1/295 250/363.06 |
| 2009/0309960 A1 | 12/2009 | Park et al. | |
| 2012/0162757 A1 | 6/2012 | Roider et al. | |
| 2012/0249863 A1 | 10/2012 | Scussat et al. | |
| 2013/0250123 A1 | 9/2013 | Zhang et al. | |
| 2013/0314567 A1 | 11/2013 | McComas et al. | |
| 2014/0036143 A1 * | 2/2014 | Katashiba | H04N 5/2254 348/369 |
| 2014/0054452 A1 | 2/2014 | Ruyter et al. | |
| 2014/0232847 A1 * | 8/2014 | Fuse | G02B 21/361 348/80 |
| 2014/0300751 A1 | 10/2014 | Orband | |
| 2015/0054936 A1 | 2/2015 | Bach et al. | |
| 2015/0316761 A1 * | 11/2015 | Williams | G02B 7/1827 359/221.4 |
| 2016/0103000 A1 * | 4/2016 | Fest | G01D 5/30 250/332 |
| 2016/0305774 A1 * | 10/2016 | Ross, Jr. | G01B 11/272 |
| 2017/0268928 A1 | 9/2017 | Chow et al. | |

OTHER PUBLICATIONS

St-Laurent et al. "Fast and accurate calibration-based thermal / colour sensors registration", Proceedings of the 10th International Conference on Quantitative InfraRed Thermography, Jul. 2010, p. 1-8.

Vidas et al. "A Mask-Based Approach for the Geometric Calibration of Thermal-Infrared Cameras", IEEE Transactions on Instrumentation and Measurement (2012), vol. 61, No. 6, p. 1625-1635.

Kim et al. "Geometrical Calibration of Multispectral Calibration", Proceedings of the 12th International Conference on Ubiquitous Robots and Ambient Intelligence (2015), p. 384-385.

Wilson et al. "Calibrating cameras in an industrial poduce inspection system", Computers and Electronics in Agriculture (2017) vol. 140, p. 386-396.

Laveigne et al., "Non-optically Combined Multi-spectral Source for IR, Visible, and Laser Testing", Proceedings of SPIE (2010) vol. 7662, pp. 1-9.

Li et al., "A Multispectral Image Creating Method for a New Airborne Four-Camera System with Different Bandpass Filters", Sensors (2015) vol. 15, pp. 17453-17469.

International Search Report and Written Opinion in Application No. PCT/US2018/042834 dated Feb. 19, 2019.

* cited by examiner

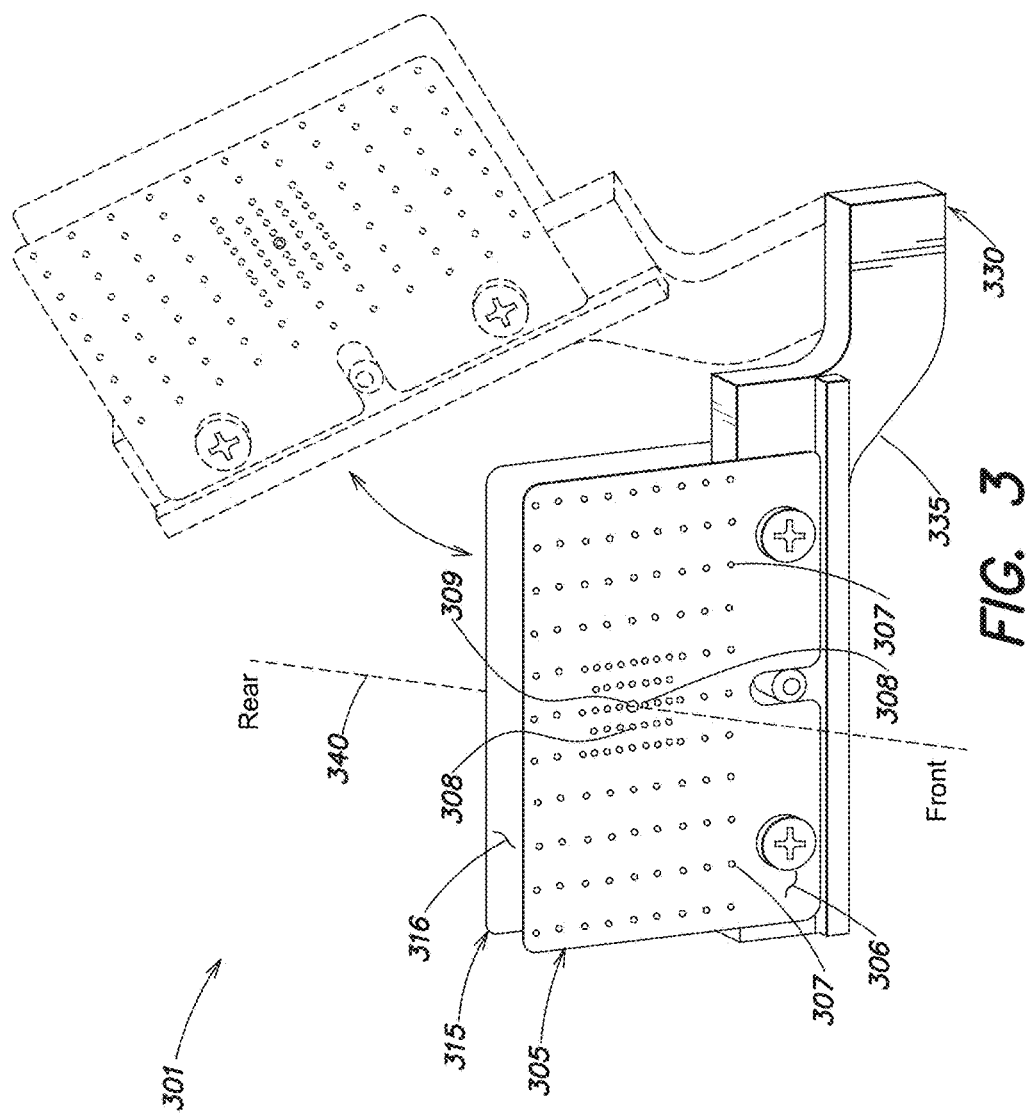

ALIGNMENT ASSEMBLY AND METHOD FOR MULTI-SPECTRAL OPTICAL SYSTEMS

BACKGROUND

Electro-optical systems are used in a variety of applications such as imaging, targeting, ranging, tracking, surveillance, and reconnaissance, among other military and civilian applications. In many such systems, multiple imaging sensors sharing a common image plane each produce respective images of a target or scene. In certain multi-spectral, electro-optical systems, different imaging sensors within the system are receptive to different spectral bands of electromagnetic radiation or light. These different spectral images allow an operator to detect and identify target characteristics that may otherwise be concealed when viewing the target in a single, narrower spectral band. Mutual alignment of the various imaging sensors within the system is necessary for ensuring that the field of view (FOV) of each respective sensor is aligned.

Typically, misalignments in an electro-optical system are detected and cured with the use of targeting boards during an initial alignment process at the time of manufacture. Since alignment tends to drift over time, targeting boards are periodically used to realign the imaging sensors. In such systems, a targeting board is located at a distance from the electro-optical system and illuminated so that it is clearly visible to all sensors. By aligning the sensors with the common targeting board, misalignments in the optical system may be detected and properly addressed.

SUMMARY OF THE INVENTION

Various aspects and examples described herein are generally directed to an alignment assembly for aligning a multi-spectral optical system, a multi-spectral optical system including an alignment assembly, and related methods of operating the same. As further described herein, the alignment assembly may include a front plate and a backplate that are arranged to form a thermal gap therebetween. The front plate includes a plurality of apertures arranged in a surface thereof that may be used during a related imaging process to align one or more imaging sensors. The front plate is movably insertable into an intermediate image plane of the optical system, the intermediate image plane being common to a plurality of imaging sensors within the optical system. Accordingly, a first image contrast corresponding to the pattern of apertures is created within a first spectral band of the electromagnetic (EM) spectrum when reflected illumination from the first plate is imaged. A second image contrast, also corresponding to the pattern of apertures, is created within a second spectral band of the EM spectrum when a thermal emissivity difference between the first plate and the second plate is imaged. As such, in various examples described herein, images of the pattern of apertures of the front plate obtained across a wide spectral range of the EM spectrum, including the infrared (IR) and visible portions of the EM spectrum, permit the same alignment assembly to facilitate mutual alignment of various imaging sensors within a multi-spectral optical system.

According to an aspect, provided is an alignment assembly for a multi-spectral optical system. In one example, the alignment assembly comprises an illumination source configured to emit illumination in a first spectral band, a first plate having a plurality of apertures formed in a reflective surface thereof, the reflective surface of the first plate being disposed to reflect the illumination emitted by the illumination source, a second plate positioned proximate to the first plate and spaced apart from the first plate to define a gap between the first plate and the second plate, the first plate being interposed between the second plate and the illumination source, and a heating element coupled to the second plate and configured to heat the second plate to emit thermal infrared radiation, from the second plate, in a second spectral band.

According to various examples, the first spectral band includes at least one of short-wavelength infrared radiation (SWIR) and visible and near-infrared radiation (VNIR), and the second spectral band includes at least one of long-wavelength infrared radiation (LWIR), mid-wavelength infrared radiation (MWIR), very long wavelength infrared radiation (VLWIR), and far infrared radiation (FIR).

In some examples, the illumination source is a light emitting diode (LED). According to some examples, the reflective surface of the first plate includes a reflective coating. In various examples, the first plate is curved. According to various examples, the pattern of apertures includes: a center aperture disposed at substantially a center of the first plate, a first subset of apertures positioned in a first regular pattern, the center aperture located at a center of the first subset of apertures, and a second subset of apertures positioned in a second regular pattern different from the first regular pattern, the center aperture located at a center of the second subset of apertures.

According to various examples, each of the first regular pattern and the second regular pattern is a grid pattern. In some examples, the first subset of apertures has a lower density of apertures than the second subset of apertures. According to some examples, each aperture of the pattern of apertures has a circular shape. In at least one example, a diameter of the center aperture is larger than a diameter of the other apertures of the pattern of apertures.

In some examples, the alignment assembly further comprises an actuator mechanically coupled to the first plate and the second plate and configured to move the first plate and second plate between at least two different positions. In various examples, the actuator is coupled to the first plate and the second plate by a support structure, and a thermal insulation element interposed between the second plate and the support structure.

According to an aspect, provided is a multi-spectral optical system. In one example, the multi-spectral optical system comprises reimaging foreoptics positioned to receive incident electromagnetic radiation and reimage the electromagnetic radiation onto an intermediate image plane, and an alignment assembly including: a pair of plates selectively positioned at the intermediate image plane, the pair of plates including a first plate and a second plate spaced apart to define a gap between the first plate and the second plate, the first plate having a plurality of apertures formed in a reflective surface thereof, an illumination source positioned to direct illumination at the reflective surface of the first plate, and a heating element coupled to the second plate and configured to heat the second plate to emit thermal infrared radiation from the second plate. The multi-spectral optical system may also comprise an actuator mechanically coupled to the pair of plates and configured to move the pair of plates between an engaged position substantially at the intermediate image plane, and a disengaged position removed from the intermediate image plane, a first imaging sensor configured to receive reflections of the illumination from the reflective surface of the first plate, and a second imaging sensor configured to detect a thermal emissivity difference between the first plate and the second plate.

According to various examples, the first plate is curved to match a curvature of the intermediate image plane. In some examples, the pattern of apertures includes: a center aperture disposed at substantially a center of the first plate, a first subset of apertures positioned in a first regular pattern, the center aperture located at a center of the first subset of apertures, and a second subset of apertures positioned in a second regular pattern different from the first regular pattern, the center aperture located at a center of the second subset of apertures. In various examples, the first subset of apertures has a lower density of apertures than the second subset of apertures.

In various examples, the illumination has a first spectral band including at least one of short-wavelength infrared radiation (SWIR) and visible and near-infrared radiation (VNIR), and the thermal infrared radiation has a second spectral band including at least one of long-wavelength infrared radiation (LWIR), mid-wavelength infrared radiation (MWIR) very long wavelength infrared radiation (VLWIR), and far infrared radiation (FIR).

According to an aspect, provided is a method of operating an alignment assembly of a multi-spectral optical system. In one example, the method comprises positioning a pair of plates of the alignment assembly at an engaged position, the pair of plates including a first plate and a second plate spaced apart to define a gap between the first plate and the second plate, the first plate being positioned substantially at an intermediate image plane of the multi-spectral optical system while at the engaged position, illuminating, via an illumination source, a reflective surface of the first plate in a first spectral band, heating, via a heating element coupled to the second plate, the second plate to emit thermal infrared radiation, from the second plate, in a second spectral band, and re-positioning the pair of plates of the alignment assembly at a disengaged position, the first plate being removed from the intermediate image plane while at the disengaged position.

According to various examples, the first spectral band includes at least one of short-wavelength infrared radiation (SWIR) and visible and near-infrared radiation (VNIR), and the second spectral band includes at least one of long-wavelength infrared radiation (LWIR), mid-wavelength infrared radiation (MWIR) very long wavelength infrared radiation (VLWIR), and far infrared radiation (FIR). In some examples, the method further comprises generating a first image of the first plate based on reflections of the illumination from the reflective surface of the first plate, and generating a second image of the first plate based on a thermal emissivity difference between the first plate and the second plate.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 3 is a perspective view of an alignment assembly according to various examples described herein;

DETAILED DESCRIPTION

Figure 1:
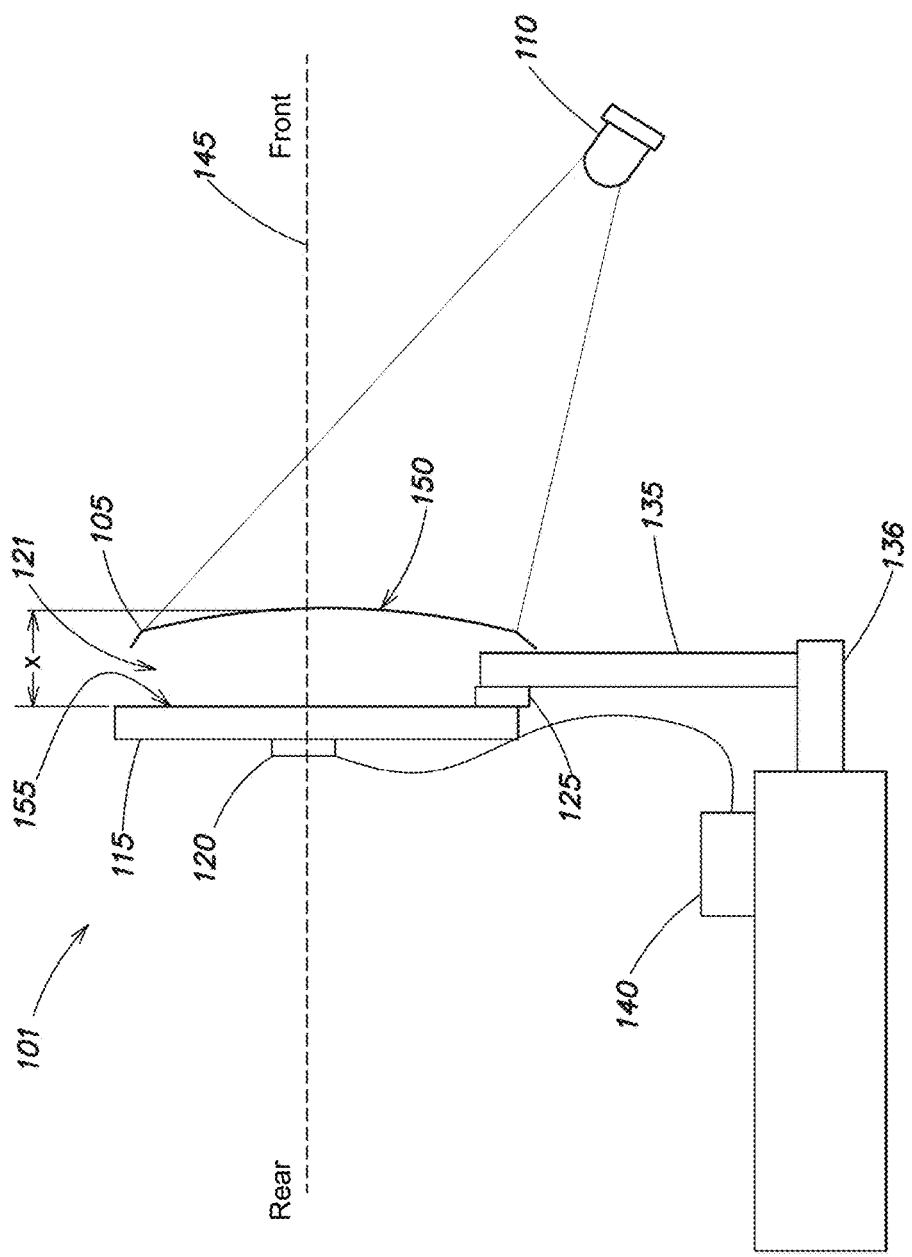
FIG. 1 is side view of an alignment assembly according to various examples described herein.

Aspects and embodiments described herein are generally directed to a multi-spectral alignment assembly, a multi-spectral optical system including a multi-spectral alignment assembly, and related methods of operating the same. The multi-spectral optical system includes one or more imaging sensors that are collectively able to detect light across multiple spectral bands of the electromagnetic (EM) spectrum. An alignment assembly is provided that is movably positioned in and out of an intermediate image plane of the multi-spectral optical system. The alignment assembly includes a reflective front plate having a plurality of apertures arranged therein and a thermally-responsive backplate positioned proximate the front plate and along an optical axis that extends between the intermediate image plane and the one or more imaging sensors. An illumination source reflects illumination off the front plate, and a heating source excites the backplate to produce thermal radiation. Each imaging sensor is able to image the pattern of apertures based on an image contrast produced by the reflected illumination or the thermal radiation. Separate alignment hardware and software is used to mutually align the imaging sensors using the pattern of apertures as a common reference.

As discussed above, typical multi-sensor alignment techniques rely on one or more targeting boards superimposed in front of each individual imaging sensor. However, it is difficult to create targeting boards that are consistent, reliable, and visible across a plurality of spectral bands. Conventionally, broadband incandescent bulbs have been used to illuminate targeting boards across multiple spectral bands. However, incandescent bulbs generally create very bright light that is difficult to uniformly "shape" across multiple spectral bands, particularly throughout the infrared (IR) spectrum. Conventional materials used to construct targeting board surfaces also tend to exhibit different reflection and absorption characteristics when interacting with radiation across different spectral bands, making it difficult to obtain multi-spectral image contrast using a single targeting board or a single light source. Incandescent bulbs also tend to suffer from poor reliability issues due to their reliance on thin filaments that are prone to burning-out or suffering damage during use.

Thus, it has been challenging to achieve a comprehensive image contrast in multiple spectral bands using conventional targeting boards and illumination sources. Conventional LED's avoid some of these challenges, but tend to lack broadband spectral characteristics sufficient to produce illumination across multiple spectral bands simultaneously.

Accordingly, various implementations of the methods and systems described herein address the deficiencies of typical alignment systems through the combined use of at least one illumination source, at least one thermal radiation source (e.g., heating element), and a pair of alignment plates featuring both a reflective front plate and a thermally-responsive backplate. Specifically, the illumination source and heating element do not suffer from same durability issues as conventional incandescent bulbs. The alignment assembly is compatible with a variety of imaging sensors having different spectral ranges and different sized fields of view (FOVs). Examples of the alignment assembly described herein are also compact, inexpensive, and simple to assemble and operate compared to existing solutions, thereby reducing maintenance challenges and overhead. Further, examples of the present alignment assembly can be deployed in the field and do not require the corresponding optical system to be taken out of service during calibration procedures.

It is to be appreciated that examples and/or embodiments of the apparatuses, systems, and methods discussed herein are not limited in application to the details of construction and the arrangement of components set forth in the following description or illustrated in the accompanying drawings. The apparatuses, systems, and methods are capable of implementation in other embodiments and of being practiced or of being carried out in various ways. Examples of specific implementations are provided herein for illustrative purposes only and are not intended to be limiting. In particular, acts, elements and features discussed in connection with any one or more examples and embodiments are not intended to be excluded from a similar role in any other example or embodiment. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 illustrates an alignment assembly 101 according to various examples described herein. In certain examples, the alignment assembly 101 may be incorporated within a multi-spectral optical system to align one or more imaging sensors, such as the multi-spectral optical system 500 shown and further described herein with reference to FIG. 5. The alignment assembly 101 includes a front plate 105, an illumination source 110, a backplate 115, a heating element (e.g., a heating source) 120, a thermal gap 121, a thermal insulation element 125, an actuation system 130, a support structure 135, and a controller 140. While not viewable in FIG. 1, in various examples the alignment assembly 101 may include, at least one pattern of apertures arranged in a surface of the front plate 105. Some examples of the pattern of apertures are further described herein with reference to FIG. 2.

Referring to FIG. 1, at least the front plate 105 is configured to be movably positioned at, or substantially at, an image plane along an optical axis 145. FIG. 1 shows an example of the front plate 105 and backplate 115 deployed along the optical axis 145 with the front plate 105 being substantially positioned at the intermediate image plane. For instance, the intermediate image plane may be an intermediate image plane within a reimaging foreoptics portion of an optical reimaging system. In some embodiments, the front plate 105 may be curved to match, or approximate, the curvature of the intermediate image plane. In particular, the front plate 105 may be sized and shaped to substantially match or exceed the size of the intermediate image plane. However, in other examples the front plate 105 may be sized and shaped to occupy less than the full image plane. Such an arrangement may reduce the spatial footprint and weight of the optical reimaging system. The front plate 105 may be constructed out of any suitably durable material, including metals, plastics, polymers, and composites thereof. The front plate 105 is mounted to the support structure 135 directly, or via a thermal insulation element such as the thermal insulation element 125 described in further detail below. The front plate 105 includes a reflective front surface 150 oriented in a direction along the optical axis 145. In FIG. 1, the reflective front surface 150 is positioned in a frontward (shown as "front" in FIG. 1) direction along the optical axis 145 when positioned at the intermediate image plane. The front surface 150 of the front plate 105 is configured to reflect illumination (e.g., infrared illumination) produced by the illumination source 110. In some embodiments, the reflective front surface 150 may be integral with the front plate 105, while in other embodiments the reflective front surface 150 may be applied to the front plate 105 as a coating or additional layer. That is, the front plate 105 may include a reflective paint or coating.

The illumination source 110 is positioned and configured to direct optical illumination incident upon the reflective front surface 150 of the front plate 105. The illumination source 110 may include one or more light emitting diodes (LEDs), incandescent bulbs, lasers, or combinations thereof configured to produce optical illumination in at least a first spectral band. In various examples, the first spectral band includes one or a combination of short-wavelength infrared radiation (SWIR) and visible and near-infrared radiation (VNIR). The illumination source 110 may further include a filter or coating configured to optimize the spectral distribution curve of the provided illumination.

The alignment assembly 101 also includes a thermally-responsive backplate 115 mounted to the support structure 135 adjacent to the front plate 105 and centered along the optical axis 145 when the front plate 105 is disposed at the intermediate image plane. Specifically, the backplate 115 is substantially squared with the front plate 105 and separated by a distance x along the optical axis 145. In various embodiments, the backplate 115 is sized and shaped to substantially match or exceed a spatial profile of the front plate 105. Accordingly, backplate 115 is superimposed behind the front plate 105 when the front surface 150 of the front plate 105 is viewed along the optical axis 145. However, in certain other examples the backplate 115 may be sized and shaped to occupy less than the full spatial profile of the front plate 105.

The backplate 115 may be constructed out of any suitably durable material, including metals, plastics, polymers, and composites thereof. The backplate 115 may be mounted to the support structure 135 directly, or via a thermal insulation element, such as the thermal insulation element 125 illustrated in FIG. 1. In particular, in the illustrated example, the backplate 115 is mounted to a substantially opposite side surface of the support structure 135 than the front plate 105. However, other arrangements are possible. In various examples, the backplate 115 includes a non-reflective or "dark" front surface 155 oriented in a direction of the front plate 105. The non-reflective surface 155 is configured to absorb optical illumination produced by the illumination source 110. In some embodiments, the non-reflective surface 155 may be integral with the backplate 115, while in other embodiments, the non-reflective surface 155 may be applied to the backplate 115 as a coating or additional layer. For instance, the non-reflective surface 155 may include a layer of black paint.

Both of the front plate 105 and the backplate 115 extend from the support structure 135 such that a gap is formed between the front plate 105 and the backplate 115. As shown in FIG. 1, a thermal gap 121 is formed between the non-reflective front surface 155 of the backplate 115 and a rearward facing surface of the front plate 105. The backplate 115 is thermally coupled to the heating element 120 which is configured to heat the backplate 115 and cause the backplate 115 to emit thermal infrared radiation within the thermal gap 121. While FIG. 1 shows the thermal gap 121 having an exposed opening to ventilate an excess build-up of heat between the backplate 115 and the front plate 105, in various other examples, the alignment assembly 101 may include one or more additional enclosures that may be placed around all or part of the thermal gap 121 to thermally isolate the gap 121 from the surrounding environment. A thermal insulation element may be positioned between the support structure 135 and the front plate 105, or between backplate 115 and the support structure 135, to thermally decouple the heating source 120 and heated backplate 115 from the front plate 105. For instance, in FIG. 1, the thermal insulation element 125 is shown positioned between the backplate 115 and the support structure 135. A similar thermal insulation element may also be positioned between the front plate 105 and the support structure 135 in other examples. Accordingly, as a result of the thermal emission of the backplate 115 (due to the heating element 120), a temperature gradient will exist between the backplate 115 and the front plate 105.

The alignment assembly 101 also includes an actuation system 130 configured to move the pair of plates 105, 115 between at least an engaged position and a disengaged position. In the engaged position, the front plate 105 substantially occupies an intermediate image plane along the optical axis 145 (as shown in FIG. 1), and in the disengaged position the front plate 105 is removed from the intermediate image plane. The actuation system 130 may include the support structure 135, an actuator 136, and a controller 140. The front plate 105 and backplate 115 are each directly or indirectly mounted to the support structure 135. The support structure 130 may comprise an arm, slide, filter wheel, combinations thereof, or any other movable support structure coupled to the actuator 136. In FIG. 1, the support structure 135 is illustrated as an arm having the front plate 105 and backplate 115 coupled to a first end, and the actuator 136 coupled to a distal second end. The actuator 136 may be hydraulic, pneumatic, electric, thermal, magnetic, mechanical, combinations thereof, or another type of actuator configured to displace the support structure 135 to move the pair of plates 115, 105. In various examples, the controller 140 is configured to send control signals to the actuator 136 to control the position of the support structure 135 and the attached pair of plates 105, 115. In some examples, the actuation system 130 may include any other components necessary to reliably move the pair of plates 105, 115 between the engaged position and the disengaged position, such as bearings, joints, and etc.

To facilitate alignment, a multi-spectral image contrast is created while the pair of plates 105, 115 is deployed in the engaged position (e.g., the front plate 105 is positioned at an intermediate image plane). In particular, an image contrast in a first spectral band is created by the optical illumination produced by the illumination source 110. Specifically, the illumination source 110 directs optical illumination of at least a first spectral band onto the front surface of the front plate 105. A first portion of the illumination incident on the reflective front surface of the front plate 105 is reflected from the front surface of the front plate 105 along the optical axis 145 in the frontward direction. A second portion of the illumination incident on the front surface 150 of the front plate 105 travels through the apertures of the front plate 105, and is absorbed by the non-reflective front surface 155 of the backplate 115. This configuration provides an image contrast within the first spectral band that is detectable by an imaging sensor positioned in the frontward direction and receptive to wavelengths within the first spectral band.

To further facilitate multi-spectral alignment, an image contrast in a second spectral band is created by the thermal emissivity difference between the backplate 115 and the front plate 105. Specifically, the heating element 120 heats the backplate 115 causing thermal radiation of a second spectral band to radiate from the backplate 115 into the thermal gap 121. In some examples, the controller 140 is configured to directly control the heating element 120; however, in other embodiments, one or more additional controllers may be included within the alignment assembly 101 and configured to control operation of the heating element 120. Once the thermally-responsive backplate 115 is sufficiently heated to emit the thermal radiation, a first portion of the thermal radiation radiates in a direction of the rear surface of the front plate 105 and travels through the pattern of apertures and long the optical axis 145. The remaining thermal radiation is absorbed by the front plate 105. Accordingly, the thermal emissivity difference between the front plate 105 and the backplate 115 (as viewed through the apertures in the front plate 105) creates an image contrast that is detectable by an imaging sensor receptive to wavelengths within the second spectral band.

In various embodiments and examples described herein, the illumination produced by the illumination source 110 may span one or more bands or sub-bands of the EM spectrum including, but not limited to, short-wavelength infrared (SWIR), very near infrared (VNIR), near infrared (NIR), visible light, and near ultraviolet (NUV). The thermal radiation emitted by the backplate 115 may also span one or more bands or sub-bands of the EM spectrum including, but not limited to, far infrared (FIR), very long-wavelength infrared (VLWIR), long-wavelength infrared (LWIR), and mid-wavelength infrared (MWIR). In certain embodiments, the spectral content of the illumination may overlap the spectral content of the thermal radiation, while in other embodiments the spectral content of the illumination may not overlap the spectral content of the thermal radiation. Various embodiments may also include additional illumination sources or heating sources configured to produce illumination or thermal radiation spanning additional portions of the EM spectrum, but otherwise function in a similar manner as is described above with respect the illumination source 110 and the heating element 120.

Figure 2:
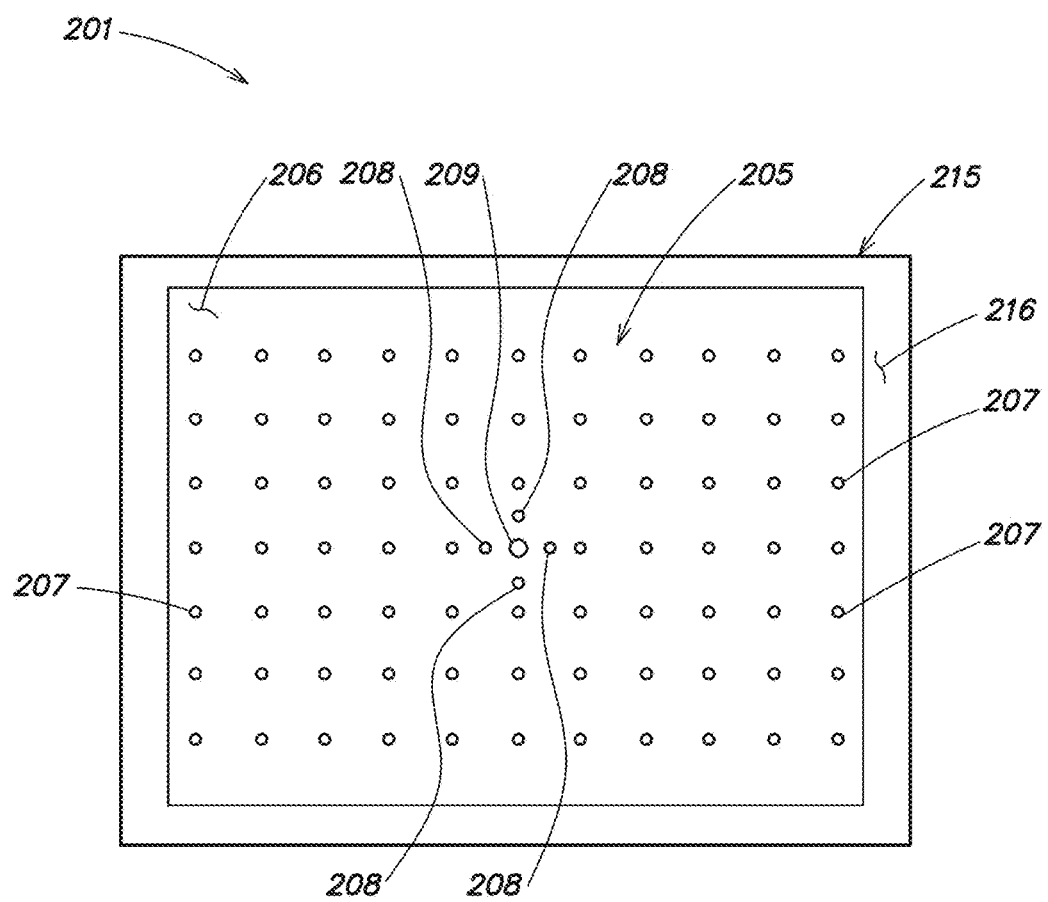
FIG. 2 is a front view of a front plate of an alignment assembly, according various examples described herein.

FIG. 2 illustrates a front view of an example of a pair of plates 205, 215, such as the pair of plates 105, 115 shown in FIG. 1. As shown, the front plate 205 has a reflective front surface 206 and a plurality of apertures arranged therein. The backplate 215 has a non-reflective surface 216 that is positioned to face the front plate 205. In FIG. 2, the surface profile of the backplate 215 is slightly obscured by the front plate 205. Accordingly, FIG. 2 illustrates the backplate 215 having a slightly larger spatial profile than the front plate 205 for the convenience of illustration. However, in many implementations the backplate 215 and the front plate 205 may be about the same size.

In various examples, the front plate 205 includes at least one uniformly distributed pattern of apertures. However, in other examples, the pattern of apertures formed in the front plate 205 may include two or subsets of apertures, each subset of apertures having a different respective pattern. Each aperture may have a same diameter or a different diameter and may extend through a thickness of the front plate 205. For instance, each aperture may extend through the front plate to permit the ingress or egress of radiation from a thermal gap formed between the front plate 205 and the backplate 215. In FIG. 2, the front plate 205 is illustrated as including a first subset of apertures arranged in a first regular pattern (referred to as the first pattern of apertures 207) and a subset of apertures arranged second regular pattern (referred to as the second pattern of apertures 208). The first pattern of apertures 207 includes an array of regularly spaced apertures with a central aperture 209 positioned at about a center of the front plate 205. The second pattern of apertures 208 includes an array of apertures also positioned about the central aperture 209. That is, the center aperture 209 may be common to both the first and second patterns of apertures 207, 208. As further illustrated in FIG. 2, in certain examples the first pattern of apertures 207 is arranged in a grid pattern across the front surface 206 of the front plate 205.

As also shown in FIG. 2, in certain embodiments, the second pattern of apertures 208 is arranged in a grid pattern having a higher aperture density relative to the first pattern of apertures 207. Specifically, the spacing between each aperture of the second pattern of apertures 208 is smaller than the spacing between each aperture of the first pattern of apertures 207. Accordingly, in various examples, the front surface 206 of the front plate 205 has a higher density of apertures in an area immediately proximate the central aperture 209, and a lesser density of apertures in an area proximate the edges of the front surface 206. In various embodiments, the central aperture 209 has a larger diameter than the apertures of the first pattern 207 and the second pattern 208.

In FIG. 2, each aperture of the first and second patterns 207, 208 is depicted as being circular. The central aperture 209 is also depicted as being circular. However, it is to be appreciated that in various embodiments, the apertures may be sized and shaped in various other manners sufficient to allow illumination and thermal radiation to pass through the front plate 205. For instance, each aperture of the first and second patterns 207, 208 and the central aperture 209 may have the same non-circular shape, or may have different circular or non-circular shapes. In various examples, the apertures (and/or each subset of the pattern of apertures) may be arranged in patterns other than those illustrated in FIG. 2. For instance, the front plate 205 may include one or more circular patterns of apertures, one or more irregular patterns of apertures, or any other suitable pattern(s). Accordingly, the arrangement and spacing of the apertures shown in FIG. 2 may be altered so long as the apertures cover a more than at least half of the front surface 206.

As discussed with respect to FIG. 1, when the pair of plates 205, 215 are positioned in the engaged position (e.g., positioned at or near an intermediate image plane), the backplate 215 is superimposed behind the front surface 206 of the front plate 205 within a field of view of one or more imaging sensors along an optical axis (not shown in FIG. 2). That is, the front surfaces 206, 216 of each plate 205, 215, respectively, face directly along the optical axis in a direction of one or more imaging sensors. Accordingly, the non-reflective front surface 216 of the backplate 215 is visible through the apertures in the front surface 206 of the front plate 205 when viewed along the optical axis from the perspective of the one or more imaging sensors.

FIG. 3 illustrates a perspective view of an alignment assembly 301 similar to the alignment assembly illustrated in FIG. 1. The alignment assembly 301 may include a front plate 305 having a reflective front surface 306, a backplate 315 having a non-reflective front surface 316, and a pattern of apertures arranged about the front plate 305. Specifically, in FIG. 3 the pattern of apertures is illustrated as including a first subset of apertures arranged in a first regular pattern (referred to as the first pattern of apertures 307) and a second subset of apertures arranged in a second regular pattern (referred to as the second pattern of apertures 308. The alignment assembly 301 may further include an actuation system 330 that includes a support structure 335 attached to the front plate 305 and the backplate 315.

In various examples, the front plate 305 and the backplate 315 may be attached to the support structure 335 by one or more fasteners. For instance, FIG. 3 illustrates the front plate 305 being attached to the support structure 335 by a plurality of screws. Accordingly, movement of the support structure 335 results in movement of the pair of plates 305, 315. In various examples, the support structure 335 may extend, rotate, spin, or move in any suitable manner, to deploy and remove the pair of plates from the optical axis 340. In FIG. 3, the alignment assembly 301 is shown as being positioned in an engaged position at an intermediate image plane and centered about the optical axis 340. A position of the alignment assembly 301 in the disengaged position is indicated in ghost lines.

As shown in FIG. 3, the front surface 306 of the front plate 305 and the front surface 316 of the backplate 315 each face directly towards a frontward direction (shown as "front", also known as "image space") along the optical axis 340. In various examples, the frontward direction of the optical axis 340 faces a direction of one or more imaging sensors. Accordingly, the front surface 306 of the front plate 305 is viewable by the one or more imaging sensors along the optical axis 340. When in the deployed position, the actuation system 300 may selectively position the pair of plates 305, 315 along the optical axis 340, and may remove the pair of plates 305, 315 from the optical axis 340. When positioned along the optical axis 340, a center aperture 309 of the first pattern of apertures 307 is substantially aligned with the optical axis 340.

The front surface 316 of the backplate 315 is visible along the optical axis 340 through each of the plurality of apertures. Accordingly, as described with respect to FIG. 1, when the front surface 306 of the front plate 305 is illuminated from the frontward direction, a first portion of the incident illumination reflects back in the frontward direction, and a second portion of the incident illumination travels through the apertures. The illumination that travels through the apertures is absorbed by the non-reflective front surface 316 of the backplate 315. This effect results in an observable image contrast in a spectral band of the illumination along the optical axis 340 from the frontward direction.

Still referring to FIG. 3, when the backplate 315 is heated, thermal radiation propagates towards, and is incident upon, the front plate 305. A first portion of the thermal radiation travels through the apertures and along the optical axis 340 in the frontward direction. A second portion of the thermal radiation is blocked and absorbed by the rear surface of the front plate 305. This effect results in a thermal emissivity contrast between the front plate 305 and the backplate 315 that is observable in a spectral band of the thermal radiation when the front plate 305 is viewed along the optical axis 340 from the frontward direction. As discussed above with reference to at least FIG. 1, in various examples, the image contrast produced by the reflected illumination may include an image contrast within a first spectral band of the infrared spectrum, such as a spectral band including short-wavelength infrared radiation (SWIR) and/or visible and near-infrared radiation (VNIR). The image contrast produced by the thermal radiation may include an image contrast with a second spectral band of the infrared spectrum, such as a spectral band including long-wavelength infrared radiation (LWIR), mid-wavelength infrared radiation (MWIR), very long wavelength infrared radiation (VLWIR), and/or far infrared radiation (FIR). Accordingly, the alignment assembly 301 may collectively provide a wide spectral resolution to facilitate alignment of spectrally diverse imaging sensors with a single alignment plate.

Figure 4A:
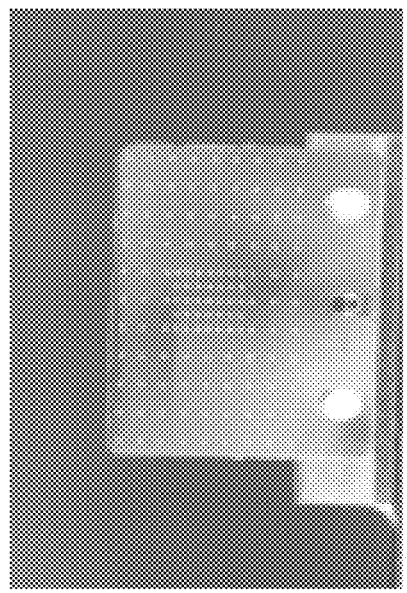
FIGS. 4A-4D are images of a front plate of an alignment assembly, according to various examples described herein.
Figure 4B:
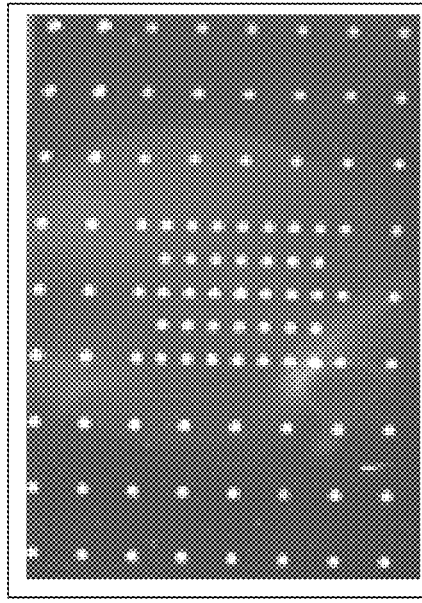
Figure 4C:
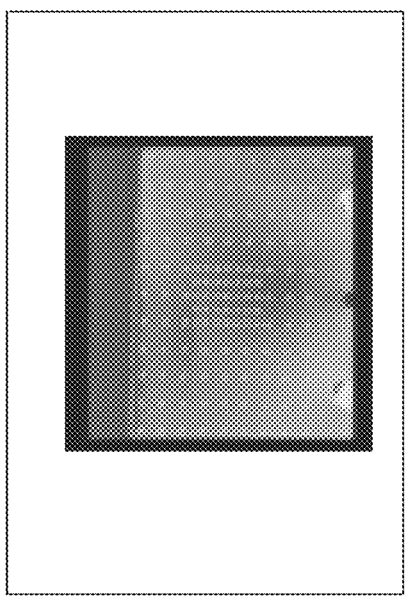
Figure 4D:
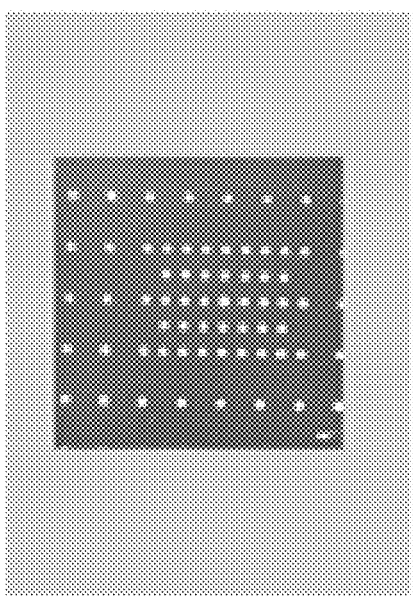

FIGS. 4A-4D illustrate examples of images of the front plate 305 captured over a wide spectral range. In particular, FIG. 4A shows an image of the front plate 305 within a spectral range of the LWIR spectral band, FIG. 4B shows an image of the front plate 305 within a spectral range of the MWIR spectral band, FIG. 4C shows an image of the front plate 305 within the wavelength range of the SWIR spectral band, and FIG. 4D shows an image of the front plate 305 within a wavelength range of the VNIR spectral band. The images are each captured by imaging sensors within a multi-spectral optical system, such as the imaging sensors 571, 572 of the optical system 500 shown in FIG. 5.

As can be seen in FIGS. 4A-4D, each image has an image contrast in which the apertures formed in the front plate 305 are visible. More specifically, in each of the images of FIGS. 4A-4B, the image appears brighter at locations corresponding to the apertures relative to the other areas of the images. That is, each image appears darker at locations corresponding to the front surface 306 of the front plate 305. This contrast pattern is caused by the thermal emissivity difference, or the reflected illumination, as discussed above with reference to at least FIGS. 1-3.

Figure 5:
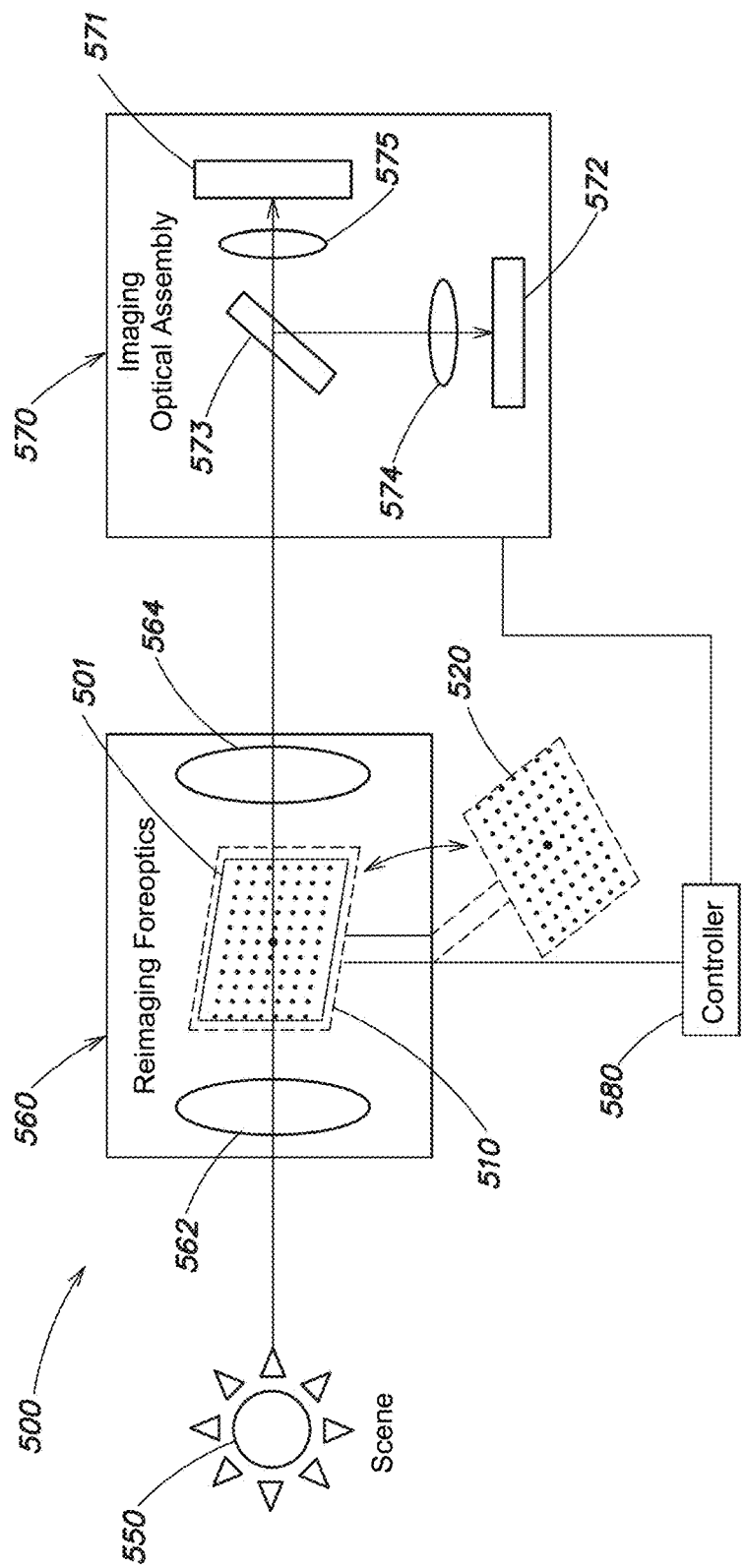
FIG. 5 is a block diagram of a multi-spectral reimaging optical system, according to various examples described herein.

Referring to FIG. 5, illustrated is one example of a multi-sensor optical system 500 that may include various examples of the alignment assembly described herein. That is, in various examples, the optical system 500 may include an alignment assembly 501, which may be the alignment assembly 100 shown in FIG. 1 or the alignment assembly 300 shown in FIG. 3. As shown, the optical system 500 may also include at least one controller 580, reimaging foreoptics 560, and an imaging optical assembly 570. As also shown in FIG. 5, the reimaging foreoptics may include a front objective 562, one or more optical components (e.g., lenses or mirrors) 564, and an intermediate image plane (indicated as ghost box) 510. The alignment assembly 501, or one or more components of the alignment assembly 501, may be selectively deployed or removed from the intermediate image plane 510. FIG. 5 shows one or more components of the alignment assembly 501 deployed at the intermediate image plane 510. Ghost lines 520 indicate a position of the alignment assembly 501, or one or more components thereof, when removed from the intermediate image plane 510. The imaging optical assembly 570 may include beamsteering optic(s) 573, a plurality of imaging sensors (e.g., first imaging sensor 571 and second imaging sensor 572), and one or more optical elements 574, 575 (e.g., mirrors or lenses).

While the alignment assembly 501 is shown as being incorporated within one particular implementation of a multi-spectral reimaging optical system, it is appreciated that in various other examples the alignment assembly 501 may be incorporated within multi-spectral optical systems having optical components and/or optical arrangements other than that of the illustrated example. For instance, while in one example the illustrated optical system 500 may include afocal foreoptics, in alternative implementations the reimaging foreoptics are not necessarily afocal.

Incident electromagnetic radiation from a distant target or "scene" 550 is received and manipulated by the reimaging foreoptics 560 so as to produce an image at the intermediate image plane 510. In various examples, electromagnetic radiation received by the reimaging foreoptics 560 enters through the front objective 562 of the optical system 500. The front objective 562 receives the electromagnetic radiation and focuses the electromagnetic radiation onto the intermediate image plane 510. In one implementation, optical components of the optical system 500 (e.g., the one or more optical components 564) are configured to substantially reimage the received electromagnetic radiation to generate an output optical beam. The output optical beam from the reimaging foreoptics 560 is directed and focused to each of the plurality of imaging sensors (e.g., the first imaging sensor 571 and the second imaging sensor 572) by the one or more optical elements 574, 575 of the imaging optical assembly 570.

As discussed herein, the intermediate image plane 510 is formed by the reimaging foreoptics 560. As discussed, the optical system 500 may include an alignment assembly 501 having a pair of plates (e.g., the front plate 105 and the backplate 115 illustrated in FIG. 1) that is selectively positionable at the intermediate image plane 510. FIG. 1 illustrates the front plate in a deployed position at the intermediate image plane 510. As used herein, the intermediate plane 510 is not defined as a discrete point and may include, for example, the area immediately proximate the image plane as defined by geometric optics. Accordingly, in various embodiments, positioning the alignment assembly 501 at the intermediate plane 510 may not restrict the front plate to the depth of focus of the intermediate image plane 510.

As discussed with reference to at least the alignment assembly 101 of FIG. 1, the pair of plates of the alignment assembly 501 may be attached to a support structure that is controllable to insert the pair of plates into the intermediate image plane 510 such that at least one of the plates (e.g., the front plate) is viewable to each imaging sensor (e.g., the first imaging sensor 571 and the second imaging sensor 572) when positioned at the intermediate image plane 510. The support structure may also be controllable to remove the pair of plates from the intermediate image plane 510 such that the at least one plate is no longer viewable to the imaging sensors 571, 572. Notably, the intermediate image plane 510 is upstream from each imaging sensor (e.g., the illustrated first imaging sensor 571 and the second imaging sensor 572). Accordingly, when the front plate is positioned at the intermediate image plane 510 it is viewable by each imaging sensor 571, 572 of the optical system 500.

As further described herein, in various examples the front plate of the alignment assembly 501 may include a plurality of apertures arranged in a surface thereof. Images of the front plate, and the pattern of apertures, provided by each imaging sensors 571, 572 may be used in one or more of the processes for correcting misalignments between imaging sensors 571, 572 and/or correcting an optical distortion. Specifically, reflections of optical illumination from a surface of the front plate may provide an image contrast within a first spectral band detectable by the first imaging sensor 571, and a thermal emissivity difference between the pair of plates (e.g., the front plate and the backplate) provides an image contrast within a second spectral band detectable by the second imaging sensor 572. Accordingly, in various examples the alignment assembly 501, when positioned at the intermediate image plane 510, is simultaneously viewable across a wide spectral range of the electromagnetic spectrum. Such an arrangement permits mutual imaging sensor alignment with a single alignment assembly.

Positioning the alignment assembly 501 within the reimaging foreoptics 560 and upstream from the imaging sensors 571, 572 enables the optical system 500 to rapidly and efficiently insert and remove the front plate of the alignment assembly 501 from the intermediate image plane 510 with minimal interference to other system components. Deployment or retraction of the alignment assembly 501 may occur at any time during operation of the optical system 500.

As discussed above, each imaging sensor (e.g., the first imaging sensor 571 and the second imaging sensor 572) may be configured to produce an image or a video stream of the image formed at the intermediate image plane 510. In particular, each imaging sensor 571, 572 may be responsive to a different spectral band of the infrared spectrum, and may generate an image responsive to receipt of radiation within the respective spectral band. A dichroic beamsplitter 573, or other beam splitting device, may be used to separate and direct the optical illumination or thermal infrared radiation to the appropriate imaging sensor. That is, the dichroic beamsplitter may split the electromagnetic radiation received from the intermediate image plane 510 as a function of the wavelengths of the electromagnetic radiation received. Alternatively, the first imaging sensor 571 and the second imaging sensor 572 may share the same focal plane. In such an embodiment, the optical system 500 can be configured to activate/deactivate the imaging sensors 571, 572 based on a wavelength of the electromagnetic radiation received. For example, where the first imaging sensor 571 may detect wavelengths within the SWIR spectral band and/or the VNIR spectral band, and the second imaging sensor 572 may detect wavelengths within the LWIR spectral band, MWIR spectral band, FIR spectral band, and/or the VLWIR spectral band.

The controller 580 is coupled to one or more components of the optical system 500, such as the alignment assembly 501. The controller 580 may include a microcontroller and/or microprocessor configured to facilitate implementation of various processes described herein. For instance the controller 580 may provide one or more control signals to an actuator that is coupled to the support structure. In particular, the controller 580 may provide one or more control signals that cause the actuator to deploy or remove the alignment assembly 501 to or from the intermediate image plane 510. The controller 580 can be, for example, implemented using hardware, software, or a combination of hardware and software. In certain examples, the controller 580 may include specially-programmed, special-purpose hardware, such as for example, an application-specific integrated circuit (ASIC) tailored to perform a particular operations disclosed herein. In certain implementations, the optical system 500 can further include a non-transitory computer readable medium, such as a memory, which can store computer program instructions that may be provided to and executed by the controller 580.

Figure 6:
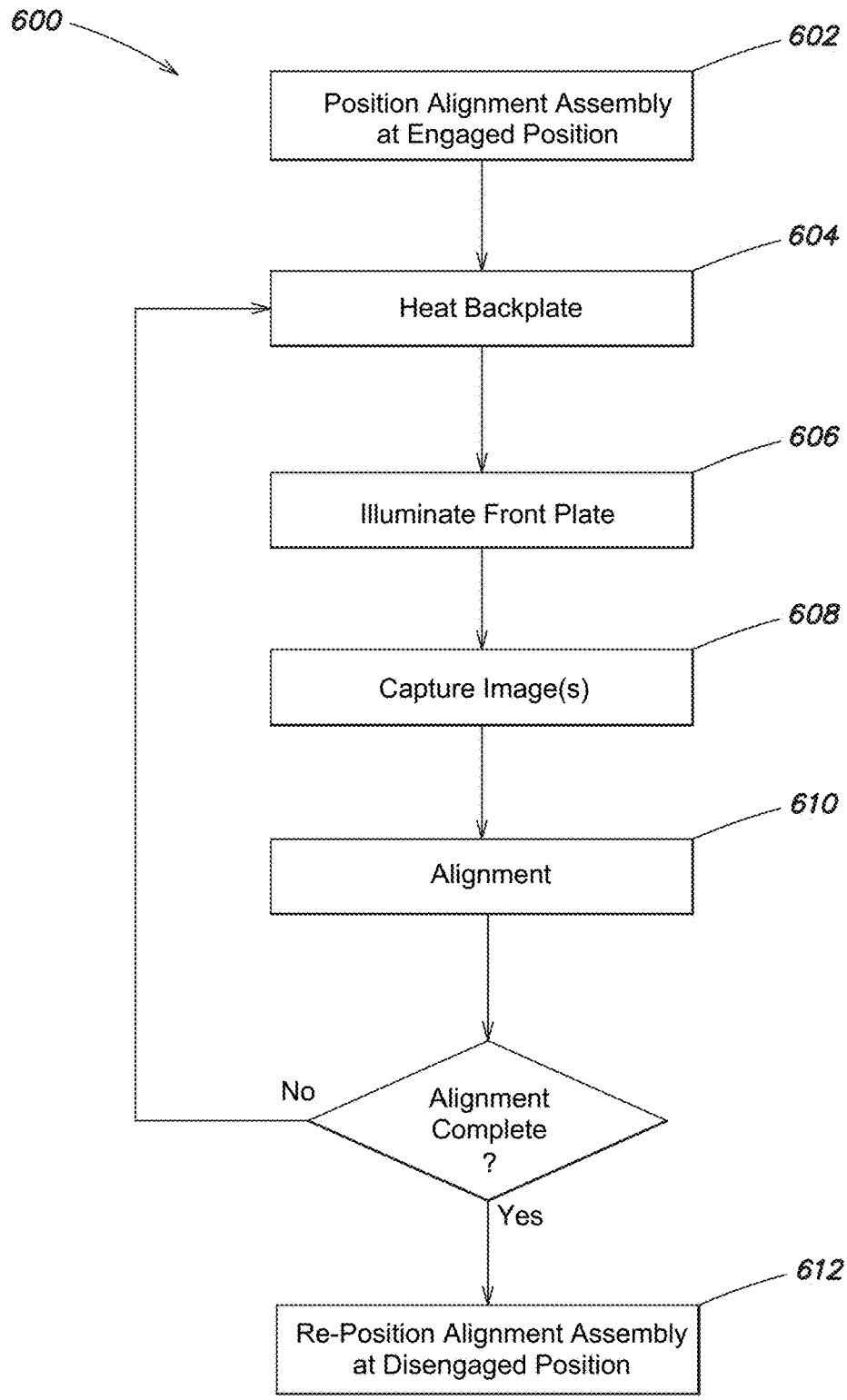
FIG. 6 is a process flow for operating an alignment assembly, according to various examples described herein.

As discussed above, various examples described herein are directed to a multi-spectral alignment assembly. Accordingly, various aspects described herein are directed to methods of operating the same. FIG. 6 illustrates one example of a process flow for operating an alignment assembly of a multi-spectral reimaging optical system. While the process flow may apply to the examples of the alignment assembly described with reference to FIG. 1, FIG. 2, and/or FIG. 3, the process flow of FIG. 6 is described with reference to the alignment assembly 101 of FIG. 1 for the convenience of description. As shown, the process 600 may include moving the alignment assembly 101 into an intermediate image plane, heating the backplate 115 to emit thermal infrared radiation, illuminating the front plate 105 to reflect infrared illumination from the front plate 105, capturing one or more images of the front plate 105, and removing the alignment assembly 101 from the intermediate image plane.

In act 602, the process 600 may include positioning the pair of plates 105, 115 at an engaged position. For instance, act 602 may include displacing, via the actuator 136 mechanically coupled to the pair of plates 105, 115, the pair of plates 105, 115 from a disengaged position into the engaged position. As discussed, the front plate 105 may be positioned substantially at an intermediate image plane while in the engaged position. In various examples, act 602 may include extending, rotating, spinning, or sliding the front plate 105 into the intermediate image plane. The particular technique for displacing the pair of plates 105, 115 may depend on the configuration and/or type of the actuator 136.

In act 604, the process 600 may include heating, via the heating element 120 thermally coupled to the backplate 115, the backplate 115 to emit thermal infrared radiation in the gap 121 such that a thermal emissivity difference between the front plate 105 and the backplate 115 provides an image contrast within a second spectral band of the infrared spectrum. In act 606, the process 600 may include illuminating, via the illumination source 110, the reflective surface 150 of the front plate 105 to provide an image contrast within a first spectral band of the infrared spectrum. For instance, act 606 may include directing infrared illumination at the reflective surface 150 of the first plate 105 with the optical illumination source 110. In various examples, the first spectral band includes at least one of short-wavelength infrared radiation (SWIR) and visible and near-infrared radiation (VNIR). As discussed herein, in various examples the second spectral band includes at least one of far infrared radiation (FIR), very long-wavelength infrared radiation (VLWIR), long-wavelength infrared radiation (LWIR), and mid-wavelength infrared radiation (MWIR).

In act 608 the process 600 may include capturing one or more images of the front plate 105 of the alignment assembly 101 with one or more imaging sensors, such as imaging sensors 571 and 572 of FIG. 5. In particular, act 608 may include generating a first image of the front plate 105 having the image contrast within the first spectral band based on reflections of the illumination from the front plate 105, and generating a second image of the front plate 105 having the image contrast within the second spectral band based on the thermal emissivity difference between the front plate 105 and backplate 115. While described with reference to FIG. 6 as being executed in conjunction with an optical system that includes two imaging sensors, it is appreciated that in various other examples, the process 600 may be applicable to optical systems having more than two imaging sensors. In these examples, each imaging sensor may be receptive to overlapping spectral bands or spectrally distinct spectral bands.

Based on the generated images, the process 600 may include performing one or more acts for aligning the optical sensors (act 610). If additional alignment operations are to be performed (e.g., for additional optical sensor(s)), the process 600 may return to act 604 and repeat acts 604-610 (e.g., for the additional optical sensor(s)). If the alignment operations are complete, the process proceeds to act 612. In act 612, the process 600 may include re-positioning the pair of plates 105, 115 at the disengaged position. For instance, act 612 may include displacing the pair of plates 105, 115 from the engaged position into the disengaged position to remove the front plate 105 from the intermediate image plane. It is appreciated that various examples of the process 600 may be utilized during deployment of a corresponding multi-spectral optical system. That is, process 600 does not require the corresponding optical system to be taken out of service prior to execution of the method 600.

Accordingly, various implementations of the methods and systems described herein address the deficiencies of typical alignment systems through the combined use of at least one illumination source, at least one thermal radiation source (e.g., heating element), and a pair of alignment plates featuring both a reflective front plate and a thermally-responsive backplate. Specifically, the illumination source and heating element do not suffer from same durability issues as conventional incandescent bulbs. The alignment assembly is compatible with a variety of imaging sensors having different spectral ranges and different sized fields of view (FOVs). Examples of the alignment assembly described herein are also compact, inexpensive, and simple to assemble and operate compared to existing solutions, thereby reducing maintenance challenges and overhead.

Having described above various features and aspects of at least one embodiment, it will be appreciated that various alterations, modifications, and improvements will readily occur to those skilled in the art. Such alterations, modifications, and improvements are intended to be part of this disclosure and are intended to be within the scope of the invention. Those skilled in the art will appreciate that the parameters and configurations described herein are exemplary and that actual parameters and/or configurations will depend on the specific application in which the disclosed systems and techniques are used. Those skilled in the art should also recognize or be able to ascertain, using no more than routine experimentation, equivalents to the specific embodiments disclosed. It is therefore to be understood that the embodiments described herein are presented by way of example only and that, within the scope of the appended claims and equivalents thereto, the disclosed embodiments may be practiced otherwise than as specifically described. Accordingly the foregoing description and figures are by way of example only, and the scope of the invention should be determined from proper construction of the appended claims, and their equivalents.

What is claimed is:

1. An alignment assembly for a multi-spectral optical system comprising:
    an illumination source configured to emit illumination in a first spectral band;
    a first plate having a plurality of apertures formed in a reflective surface thereof, the reflective surface of the first plate being disposed to reflect the illumination emitted by the illumination source;
    a second plate positioned proximate to the first plate and spaced apart from the first plate to define an open gap between the first plate and the second plate, the first plate being interposed between the second plate and the illumination source; and
    a heating element coupled directly to the second plate and configured to heat the second plate to emit thermal infrared radiation within the open gap, from the second plate, in a second spectral band.

2. The alignment assembly of claim 1, wherein the first spectral band includes at least one of short-wavelength infrared radiation (SWIR) and visible and near-infrared radiation (VNIR), and wherein the second spectral band includes at least one of long-wavelength infrared radiation (LWIR), mid-wavelength infrared radiation (MWIR), very long wavelength infrared radiation (VLWIR), and far infrared radiation (FIR).

3. The alignment assembly of claim 1, wherein the illumination source is a light emitting diode (LED).

4. The alignment assembly of claim 1, wherein the reflective surface of the first plate includes a reflective coating.

5. The alignment assembly of claim 1, wherein the first plate is curved.

6. The alignment assembly of claim 1, wherein the pattern of apertures includes:
    a center aperture disposed at substantially a center of the first plate;
        a first subset of apertures positioned in a first regular pattern, the center aperture located at a center of the first subset of apertures; and
        a second subset of apertures positioned in a second regular pattern different from the first regular pattern, the center aperture located at a center of the second subset of apertures.

7. The alignment assembly of claim 6, wherein each of the first regular pattern and the second regular pattern is a grid pattern.

8. The alignment assembly of claim 6, wherein the first subset of apertures has a lower density of apertures than the second subset of apertures.

9. The alignment assembly of claim 8, wherein each aperture of the pattern of apertures has a circular shape.

10. The alignment assembly of claim 9, wherein a diameter of the center aperture is larger than a diameter of the other apertures of the pattern of apertures.

11. The alignment assembly of claim 1, further comprising an actuator mechanically coupled to the first plate and the second plate and configured to move the first plate and second plate between at least two different positions.

12. The alignment assembly of claim 11, wherein the actuator is coupled to the first plate and the second plate by a support structure, and wherein a thermal insulation element interposed between the second plate and the support structure.

13. A multi-spectral optical system comprising:
    reimaging foreoptics positioned to receive incident electromagnetic radiation and reimage the electromagnetic radiation onto an intermediate image plane;
    an alignment assembly including:

a pair of plates selectively positioned at the intermediate image plane, the pair of plates including a first plate and a second plate spaced apart to define an open gap between the first plate and the second plate, the first plate having a plurality of apertures formed in a reflective surface thereof, an illumination source positioned to direct illumination at the reflective surface of the first plate, and a heating element coupled directly to the second plate and configured to heat the second plate to emit thermal infrared radiation from the second plate in the open gap;

an actuator mechanically coupled to the pair of plates and configured to move the pair of plates between an engaged position substantially at the intermediate image plane, and a disengaged position removed from the intermediate image plane;

a first imaging sensor configured to receive reflections of the illumination from the reflective surface of the first plate; and a second imaging sensor configured to detect a thermal emissivity difference between the first plate and the second plate.

14. The multi-spectral optical system of claim 13, wherein the first plate is curved to match a curvature of the intermediate image plane.

15. The multi-spectral optical system of claim 13, wherein the pattern of apertures includes:

a center aperture disposed at substantially a center of the first plate;

a first subset of apertures positioned in a first regular pattern, the center aperture located at a center of the first subset of apertures; and a second subset of apertures positioned in a second regular pattern different from the first regular pattern, the center aperture located at a center of the second subset of apertures.

16. The multi-spectral optical system of claim 15, wherein the first subset of apertures has a lower density of apertures than the second subset of apertures.

17. The multi-spectral optical system of claim 13, wherein the illumination has a first spectral band including at least one of short-wavelength infrared radiation (SWIR) and visible and near-infrared radiation (VNIR), and wherein the thermal infrared radiation has a second spectral band including at least one of long-wavelength infrared radiation (LWIR), mid-wavelength infrared radiation (MWIR) very long wavelength infrared radiation (VLWIR), and far infrared radiation (FIR).

18. A method of operating an alignment assembly of a multi-spectral optical system, the method comprising:

positioning a pair of plates of the alignment assembly at an engaged position, the pair of plates including a first plate and a second plate spaced apart to define an open gap between the first plate and the second plate, the first plate being positioned substantially at an intermediate image plane of the multi-spectral optical system while at the engaged position;

illuminating, via an illumination source, a reflective surface of the first plate in a first spectral band;

heating, via a heating element coupled directly to the second plate, the second plate to emit thermal infrared radiation in the open gap, from the second plate, in a second spectral band; and re-positioning the pair of plates of the alignment assembly at a disengaged position, the first plate being removed from the intermediate image plane while at the disengaged position.

19. The method of clam 18, wherein the first spectral band includes at least one of short-wavelength infrared radiation (SWIR) and visible and near-infrared radiation (VNIR), and the second spectral band includes at least one of long-wavelength infrared radiation (LWIR), mid-wavelength infrared radiation (MWIR) very long wavelength infrared radiation (VLWIR), and far infrared radiation (FIR).

20. The method of claim 18, further comprising:

generating a first image of the first plate based on reflections of the illumination from the reflective surface of the first plate; and generating a second image of the first plate based on a thermal emissivity difference between the first plate and the second plate.

* * * * *